United States Patent
Leung

(10) Patent No.: US 8,622,415 B2
(45) Date of Patent: Jan. 7, 2014

(54) CONVERTIBLE TRANSPORT APPARATUS

(75) Inventor: Anthony Kit Lun Leung, Hong Kong (CN)

(73) Assignee: Conair Corporation, Stamford, CT (US)

( * ) Notice: Subject to any disclaimer, the term of this patent is extended or adjusted under 35 U.S.C. 154(b) by 182 days.

(21) Appl. No.: 13/045,903

(22) Filed: Mar. 11, 2011

(65) Prior Publication Data

US 2011/0221146 A1 Sep. 15, 2011

Related U.S. Application Data

(60) Provisional application No. 61/312,925, filed on Mar. 11, 2010.

(51) Int. Cl.
*B62B 1/04* (2006.01)
(52) U.S. Cl.
USPC ............................ 280/651; 281/40; 281/47.18
(58) Field of Classification Search
USPC ............ 280/35, 639, 38, 40, 651, 652, 47.18, 280/47.21, 47.24, 47.26, 47.27, 47.28, 280/47.29
See application file for complete search history.

(56) References Cited

U.S. PATENT DOCUMENTS

| | | | | |
|---|---|---|---|---|
| 4,114,914 A | * | 9/1978 | Cohen | 280/30 |
| 4,281,849 A | * | 8/1981 | Chandick et al. | 280/655 |
| 4,576,389 A | * | 3/1986 | Villaveces et al. | 280/43.16 |
| 4,684,141 A | * | 8/1987 | Nunokawa | 280/40 |
| 4,826,196 A | * | 5/1989 | Kirkpatrick et al. | 280/650 |
| 5,127,662 A | | 7/1992 | Spak | |
| 5,127,664 A | * | 7/1992 | Cheng | 280/655 |
| 5,263,727 A | | 11/1993 | Libit et al. | |
| D342,363 S | | 12/1993 | Stein | |
| 5,294,145 A | | 3/1994 | Cheng | |
| 5,348,325 A | | 9/1994 | Abrams | |
| 5,367,743 A | | 11/1994 | Chang | |
| 5,544,910 A | | 8/1996 | Esposito | |
| 5,549,318 A | | 8/1996 | Ho | |
| D376,238 S | | 12/1996 | Tsai | |
| 5,626,351 A | | 5/1997 | Tsai | |
| 5,639,109 A | | 6/1997 | Liang | |
| 5,730,264 A | | 3/1998 | Lu | |
| 5,797,617 A | | 8/1998 | Lin | |
| 5,951,037 A | | 9/1999 | Hsieh et al. | |
| 5,970,579 A | | 10/1999 | Lu | |
| D419,740 S | | 1/2000 | Blaha et al. | |
| 6,012,729 A | | 1/2000 | Lin | |
| 6,050,592 A | | 4/2000 | Kim | |

(Continued)

FOREIGN PATENT DOCUMENTS

JP 2009113755 A * 5/2009

*Primary Examiner* — John Walters
(74) *Attorney, Agent, or Firm* — Carter, DeLuca, Farrell & Schmidt, LLP

(57) ABSTRACT

An apparatus (10) for transporting items includes a base (12), a handle element (16) extending from the base (12), a pair of rollers or wheels (20) mounted to the base (12) and a platform (14) mounted to the base (12) and adapted for movement between a stored condition and an operative position. The platform (14) includes first and second leg elements (24) and a platform support (26) connected to the first and second leg elements (24) and extending therebetween. The platform (14) is dimensioned and adapted to carry an object when in the operative position. The platform support (26) may comprise a flexible material such as a fabric material.

12 Claims, 19 Drawing Sheets

(56) References Cited

U.S. PATENT DOCUMENTS

| | | | |
|---|---|---|---|
| 6,053,514 A | 4/2000 | Su | |
| D448,907 S | 10/2001 | Tsai | |
| 6,425,599 B1 * | 7/2002 | Tsai | 280/652 |
| 6,447,002 B1 | 9/2002 | Fang | |
| RE38,436 E | 2/2004 | Su | |
| 6,866,290 B2 | 3/2005 | Tsai | |
| 6,923,466 B2 | 8/2005 | Tsai | |
| 7,097,183 B1 | 8/2006 | Su | |
| 7,252,296 B2 | 8/2007 | Miyoshi | |
| 7,387,306 B2 | 6/2008 | Zimmer | |
| 7,441,785 B1 | 10/2008 | Tsai | |
| 7,445,231 B1 | 11/2008 | Tsai | |
| 7,458,600 B1 | 12/2008 | Berke et al. | |
| 7,614,628 B2 | 11/2009 | O'Connor | |
| 2002/0096862 A1 | 7/2002 | Fang | |
| 2003/0038007 A1 | 2/2003 | Han | |
| 2006/0226619 A1 | 10/2006 | Sadow | |
| 2010/0327562 A1 * | 12/2010 | Kasuya et al. | 280/651 |

* cited by examiner

CONVERTIBLE TRANSPORT APPARATUS

CROSS-REFERENCE TO RELATED APPLICATIONS

This application claims priority to, and the benefit of, U.S. Provisional Application Ser. No. 61/312,925, filed Mar. 11, 2010.

BACKGROUND

1. Technical Field

The present invention relates to a transport apparatus and, more particularly, to a foldable transport apparatus adapted to transport items including groceries, luggage or the like.

2. Background of the Related Art

Various designs exist and are commonly known for foldable hand-truck style carts, commonly referred to as "luggage carts" and used for transporting suitcases, briefcases, small boxes and other items. These luggage carts having various features to facilitate transport and retention of the item and for storage of the cart.

SUMMARY

Accordingly, the present invention relates to a foldable or convertible luggage cart having enhanced versatility to accommodate different size objects, and which is convertible for storage. In accordance with one embodiment of the present invention, an apparatus for transporting items includes a base, a handle element extending from the base, a pair of rollers mounted to the base and a platform mounted to the base and adapted for movement between a stored condition and an operative position. The platform includes first and second leg elements and a platform support connected to the first and second leg elements and extending therebetween. The platform is dimensioned and adapted to carry an object when in the operative position. The platform support may comprise a flexible material such as a fabric material.

The first and second leg elements of the platform may be capable of relative movement between a first relative orientation to a second relative orientation. The first and second leg elements are displaced when in the second relative orientation. The first and second leg elements are adapted to pivot relative to the base to move between the first and second relative orientations.

A retainer support may be mounted to the handle. The retainer support may be dimensioned and positioned to provide lateral support to the object carried by the platform. The retainer support may include a cord mountable thereto, and adapted for positioning about the object to secure the object relative to the platform.

The rollers or wheels may be adapted for relative movement between a first roller position defining a first predetermined distance therebetween and a second relative position defining a second predetermined distance therebetween greater than the first predetermined distance. The handle may include at least two handle segments in telescoping arrangement to vary an effective length of the handle.

In an alternate embodiment, the apparatus for transporting includes a handle, a platform mounted to the handle and dimensioned and adapted to carry an object, a pair of wheels mounted to the platform and first and second racks on opposed sides of the platform. The racks are movable between inward and outward positions wherein, in the outward position, the racks increase an effective support area of the platform support. The handle and the base may be adapted for relative movement between a stored condition and an operative position. The platform may be substantially rigid. The handle may include a retainer support for supporting the object in a lateral direction.

BRIEF DESCRIPTION OF THE DRAWINGS

Various embodiments of the present disclosure are described hereinbelow with references to the drawings, wherein.

DETAILED DESCRIPTION OF THE EMBODIMENTS

Figures 1A, 1B:
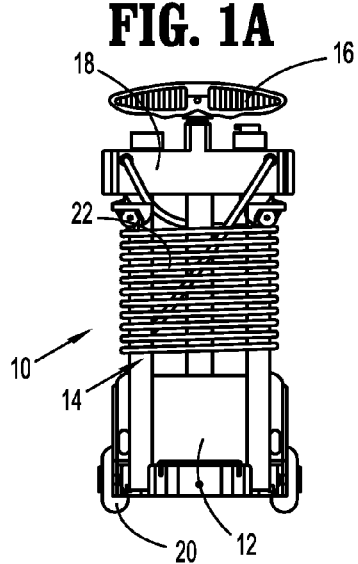
FIGS. 1A-1D are respective front, side, top and perspective views of the transport apparatus in accordance with the principles of the present invention in the inoperative stored condition thereof.
Figure 1D:
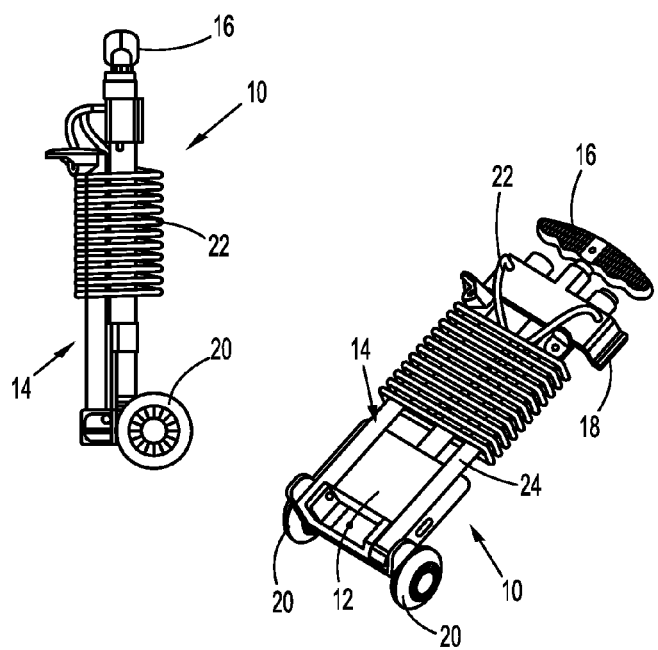
Figure 1C:
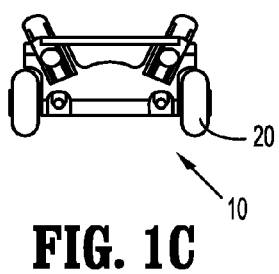
Figure 2:
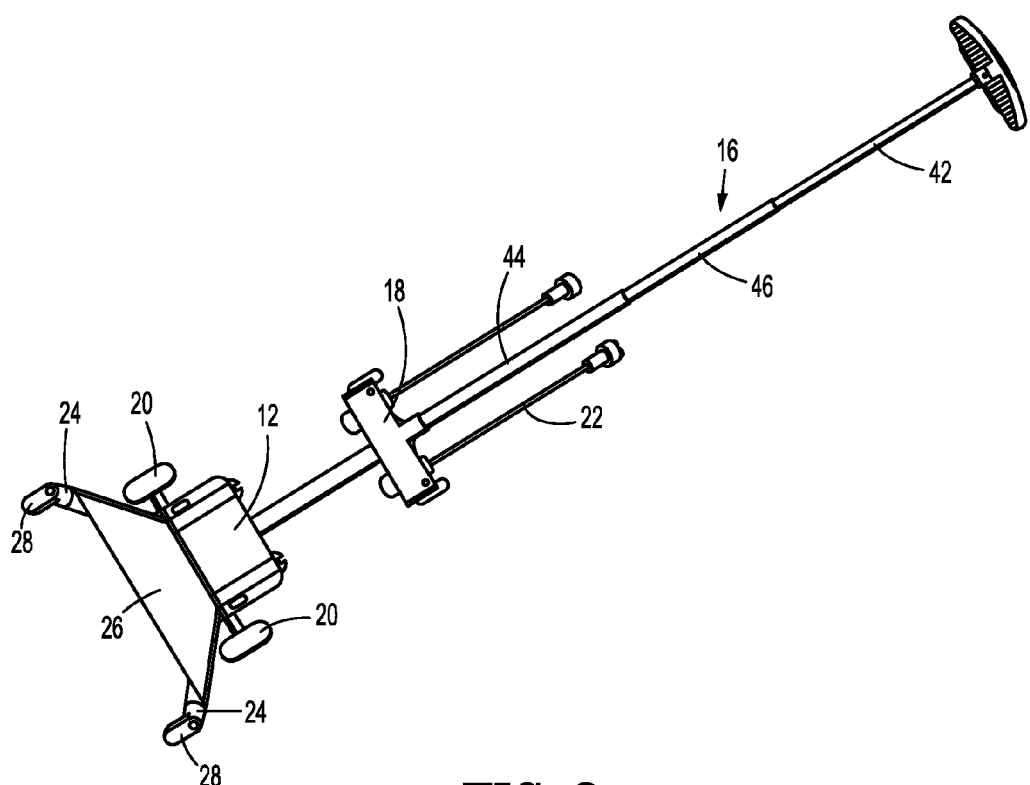
FIG. 2 is a perspective view of the transport apparatus in the operative condition thereof capable of for supporting an item such as luggage.

Referring now to the drawings wherein like reference numerals identify similar components throughout the several views, FIGS. 1A-1D and FIG. 2 illustrate the transport apparatus 10 in accordance with the principles of the present invention. In FIGS. 1A-1D, transport apparatus 10 is in the stored inoperative condition while FIG. 2 illustrates the transport apparatus 10 in the open operative condition. Transport apparatus 10 includes base 12, platform 14 which is movably mounted to the base 12, handle 16 and retainer/cord support 18 mounted to the handle 16. Base 12 has a set of wheels 20 mounted thereto for transport of the apparatus 10. Retainer support 18 has a cord 22, e.g., a bungee cord, connected thereto for securing about the item. In FIGS. 1A-1D, cord 22 is depicted stored in a wrapped arrangement.

Figure 3:
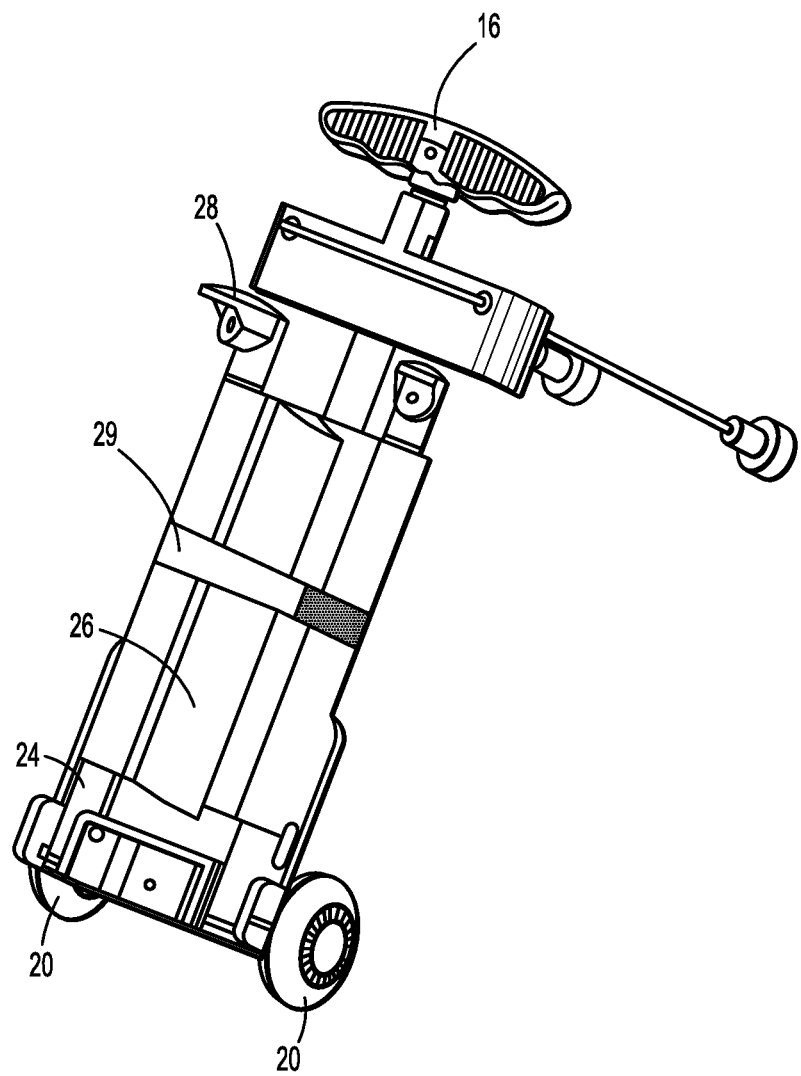
FIG. 3 is a perspective view of the transport apparatus illustrating the cord unwrapped.
Figure 4:
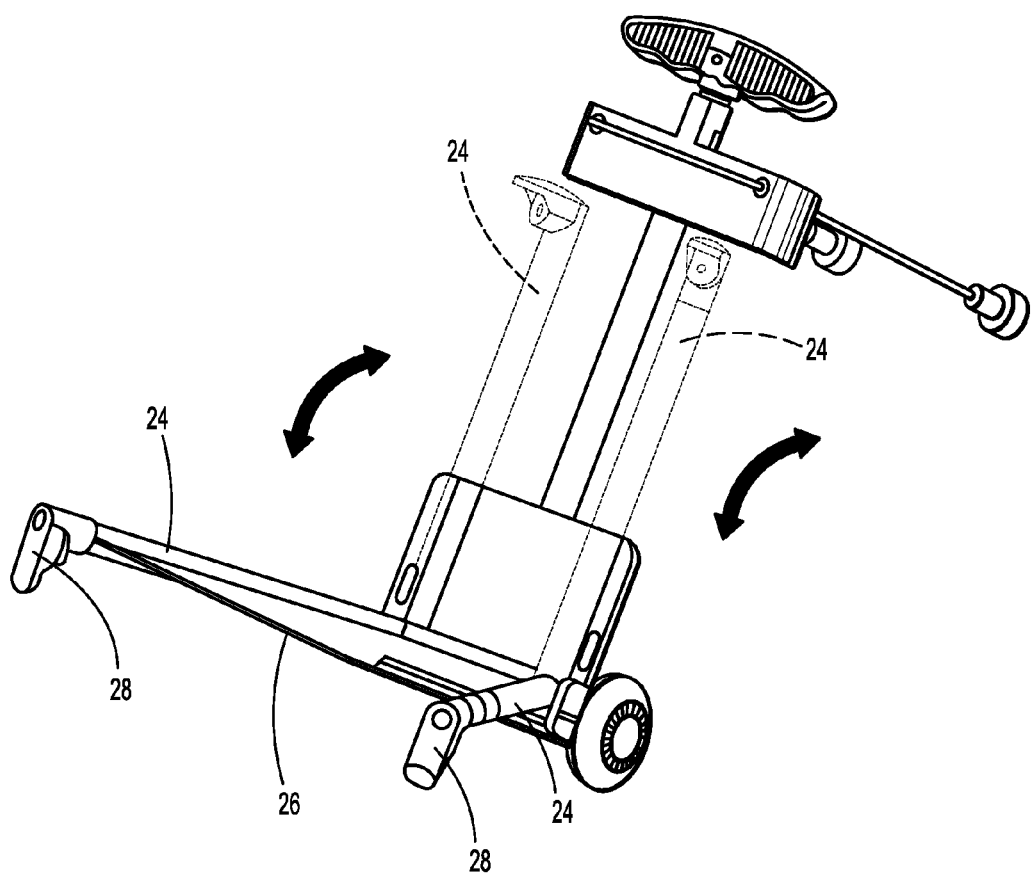
FIG. 4 is a view illustrating the platform moved from its stored condition to its supporting condition.

Platform 14 is movable from a stored condition of FIGS. 1A-1D to the open condition of FIGS. 2 and 4. Platform 14 includes first and second leg elements 24 and a support element 26 extending between and connected to the leg elements 24. Support element 26 is not shown in FIGS. 1A-1D for clarity reasons. In FIG. 3, support element 26 is illustrated secured about leg elements 24 when in the stored condition. A flexible Velcro™ wrap 29 may be positioned about support element 26 to secure the support elements 26 when in the stored position of the apparatus 10. Support element 26 may be a flexible material and, in one embodiment, comprises a fabric material. Leg elements 24 may be substantially rigid fabricated from a suitable polymeric, metallic material or the like. Leg elements 24 each include a depending foot 28 for engagement with the floor surface. Leg elements 24 are adapted for movement, e.g., pivotal movement, relative to the base 12 between open and closed positions thereof. (See FIG. 4).

Figure 5:
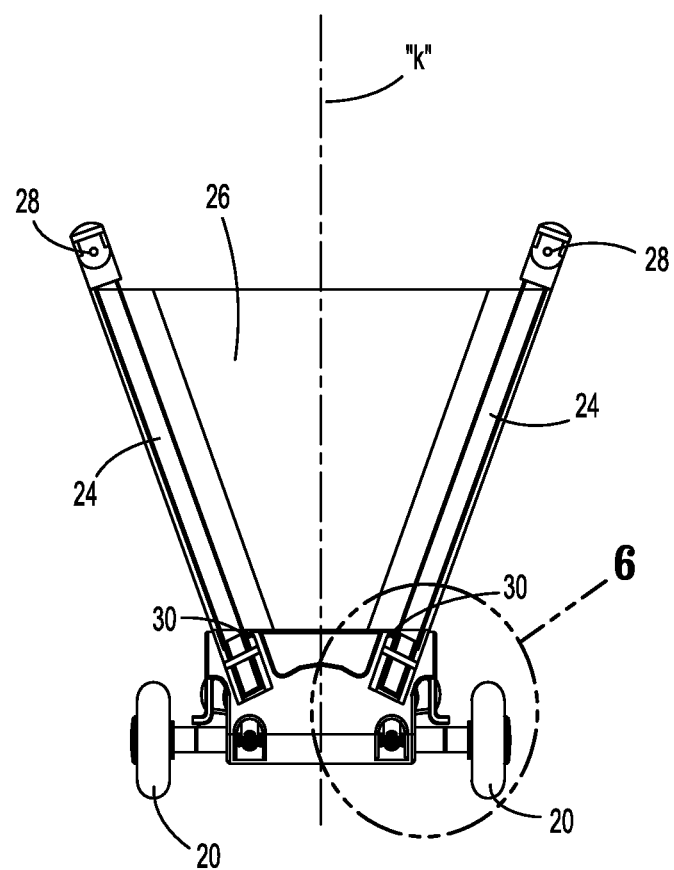
FIG. 5 is a bottom plan view illustrating the platform in the supporting condition thereof.
Figures 6, 6A:
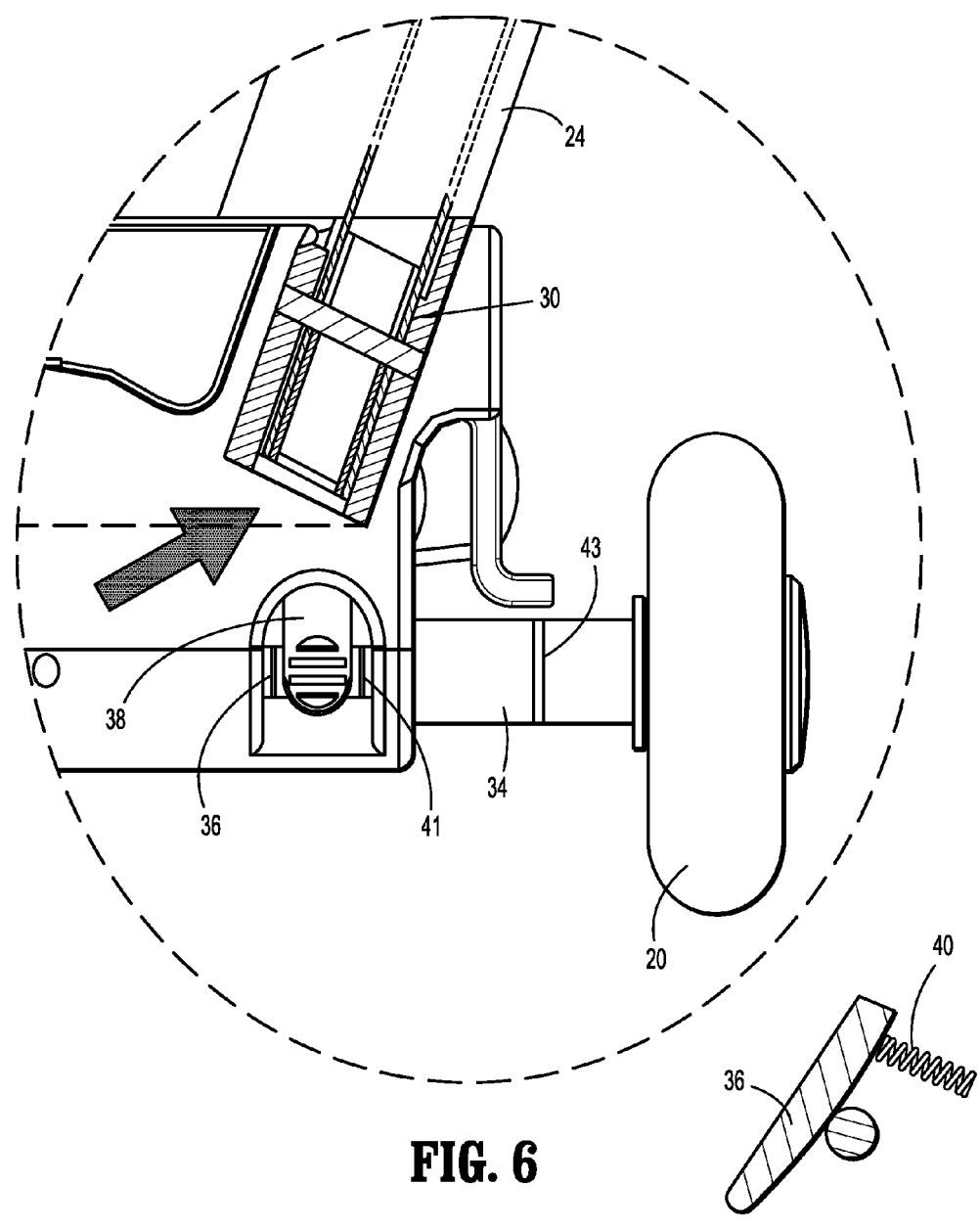
FIG. 6 is an enlarged isolated view of the area of illustration depicted in FIG. 5.
FIG. 6A is a view illustrating the detent mechanism for releasably securing the wheels in first and second varying positions.
Figure 7:
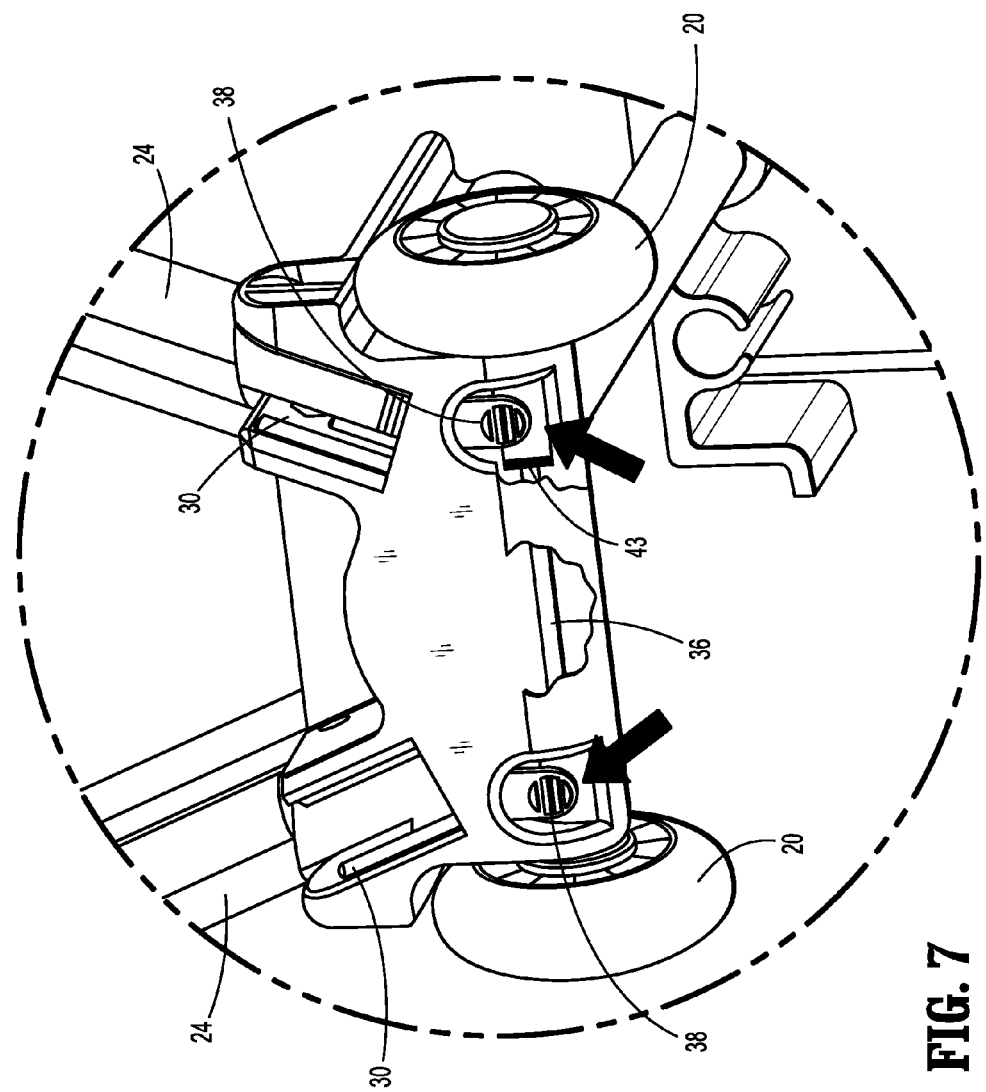
FIG. 7 is an enlarged isolated view of the base of the transport apparatus.
Figure 8:
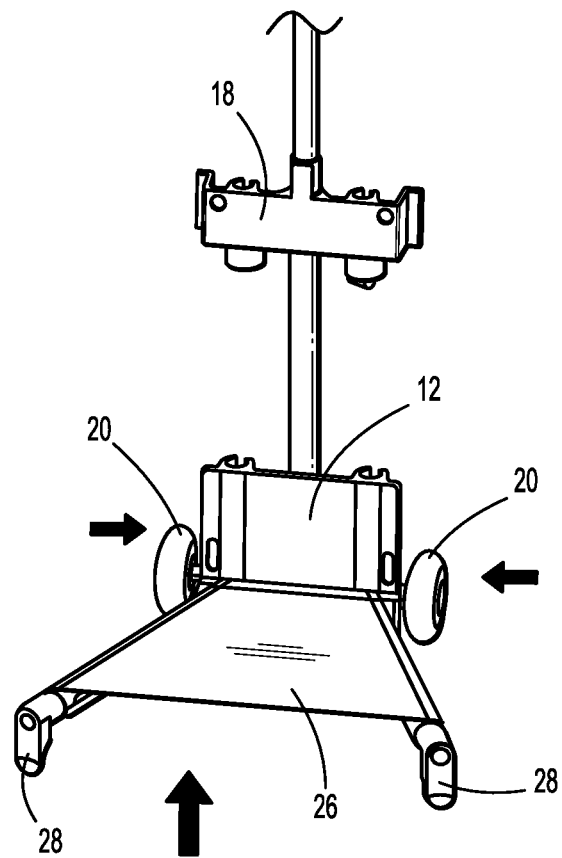
FIG. 8 is a front perspective view of the transport apparatus in the open condition and with the wheels in a first position.
Figure 9:
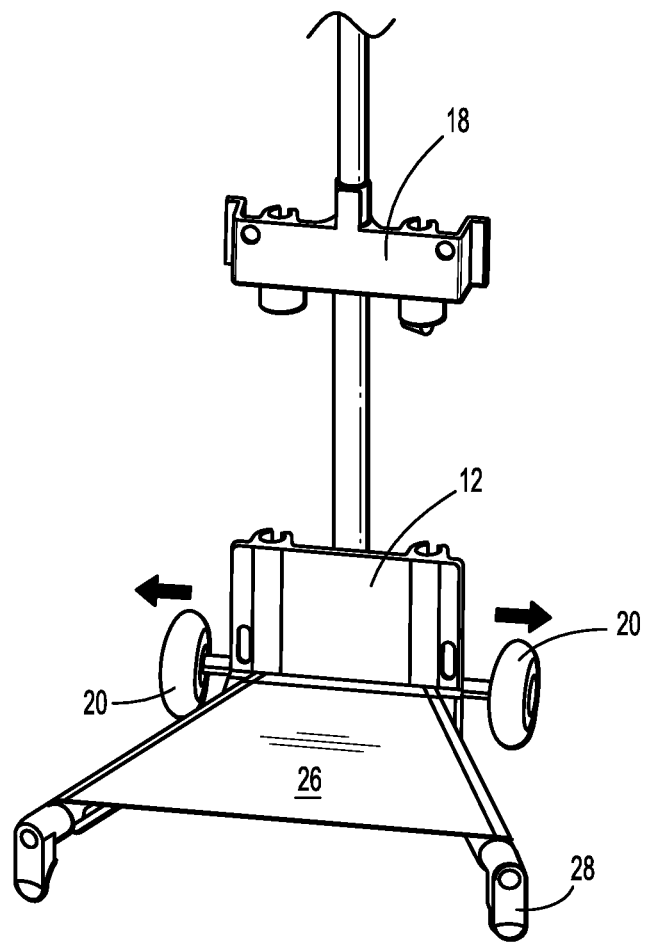
FIG. 9 is a view similar to the view of FIG. 8 illustrating the wheels in a relative displaced position.

With reference to FIGS. 5-7, in one embodiment, base 12 includes opposing grooves 30 which at least partially accommodate leg elements 24. Grooves 30 are angulated with respect to each other and obliquely arranged relative to longitudinal axis "k" of the base 12. Leg elements 24 each pivot about pivot pin 32 mounted within grooves 30 to assume the open condition. Pivot pin 32 is also arranged orthogonal to each groove 30. As a consequence, leg elements 24 depend outwardly relative to the axis "k" when in the open condition, i.e., at an acute angle relative to each other, to thereby increase the stability of the apparatus 10 and securement of the object thereby supported. Moreover, the respective distance between feet 28 of leg elements increases in the open condition of the leg elements. In the closed position, leg elements 24 are generally in a parallel arrangement as shown in FIG. 3.

With reference to FIGS. 6-9, wheels 20 of base 12 may be displaced from a first position (FIGS. 7 and 8) defining a first predetermined distance therebetween to a second position (FIGS. 6 and 9) defining a second predetermined position therebetween greater than the first predetermined position. The second position provides greater stability characteristics to apparatus 10, when for example, carrying a heavy or wide load. The first position also corresponds to the stored condition of the apparatus 10. In one arrangement, each wheel 20 is mounted about a wheel axle 34 which is telescopically received over a main axle support 36 extending within, and mounted to, the interior base 12. Each wheel axle 34 may slide relative to the main axle support 36 between the first and second positions thereof.

As best depicted in FIGS. 6 and 6A, in one arrangement, a detent mechanism selectively secures wheels 20 in either the first or second position. The detent mechanism may include a manually actuated button 38 which is normally spring biased (through spring 40) into engagement with wheel axle 34 or main axle support 36. The button 38 may be lifted and/or depressed to cause release of main axle support 36 or wheel axle 34 and permit selective movement of the wheel axle 34 beyond stops 41, 43 mounted to main axle support 36 or wheel axle 34. Upon release of button 38, the button 38 returns to its normal position into engagement with the respective wheel axle 34. Stops 41 on main axle support 36 and wheel axle 34 are positioned to correspond to at least the first and second positions of wheels 20. Thus, when the operator desires to move the wheels from the first inward position of FIGS. 7 and 9 to the second outward position of FIGS. 6 and 8, the button 38 is actuated to permit the button to clear stop 43 on wheel axle 34 (see FIG. 7). To return to the second inward position, the button 38 is actuated to clear stops 41 on main axle support 36 (FIG. 6). Other arrangements for selectively securing wheels in the first and second positions are also envisioned.

Figure 10:
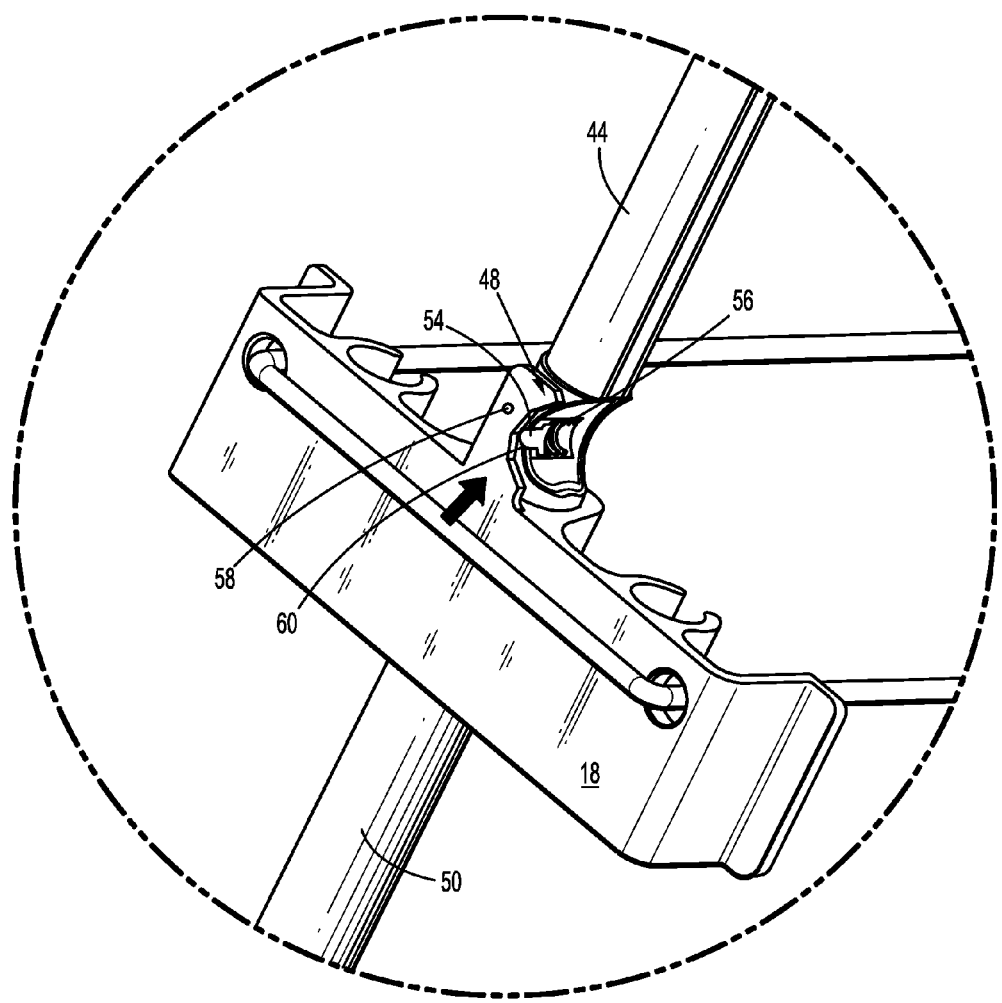
FIG. 10 is an enlarged isolated view of the retainer support of the transport apparatus.

With reference to FIGS. 2 and 10, handle 16 is also adjustable in length and may include at least two coaxial tubes possibly, three, i.e., upper, lower, and intermediate handles 42, 44, 46 arranged in telescopic manner. Handles 42, 44, 46 may be selectively moved or adjusted relative to each other to vary the effective length of handle 16. Means for securing handles 42, 44, 46 relative to each other are envisioned including friction fits, compression fits or sleeves or the like.

In one embodiment, retainer support 18 includes a lock 48 which may be actuated to permit selective adjustment of at least lower tube 44 relative to main handle support 50 connected to base 12. The lock 48 may include a spring ball mechanism or the like. For example, lock 48 may include a detent 54 biased by spring 56 radially outwardly through opening 58 in main handle support 50 to impede movement of handles 42, 44, 46 within main handle tube 50. Actuator or button 60 may be displaced inwardly through manual engagement to displace the lock or detent 48 inwardly against spring 56 to permit handle 44 to slide past lock 48 and into main handle tube 50. This action will also permit the remaining handles 42, 46 to move to the stored condition of FIGS. 1A-1D. Retainer support 18 may be dimensioned to provide lateral support to the object carried by the platform 14.

Figure 11:
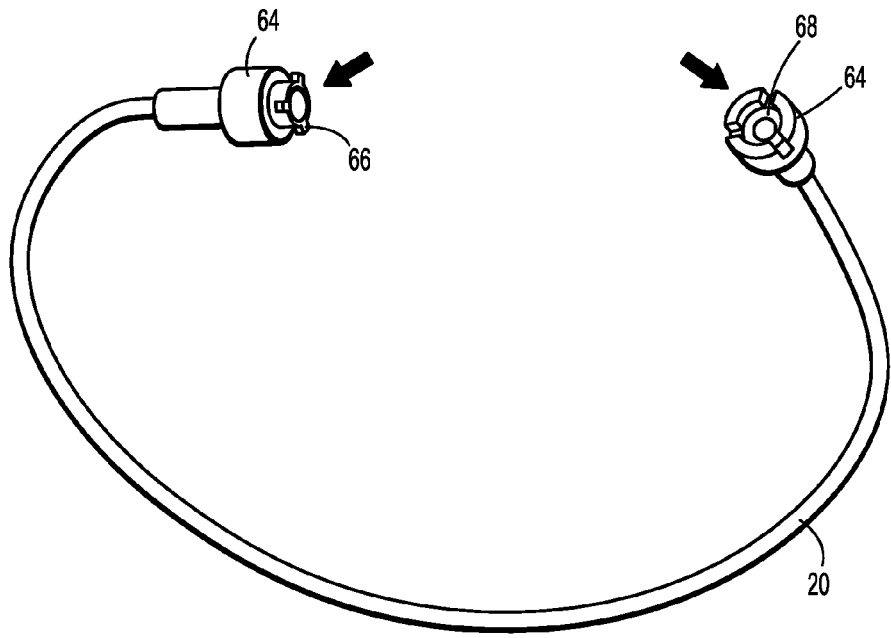
FIG. 11 is a perspective view of the cord with connectors.
Figure 12:
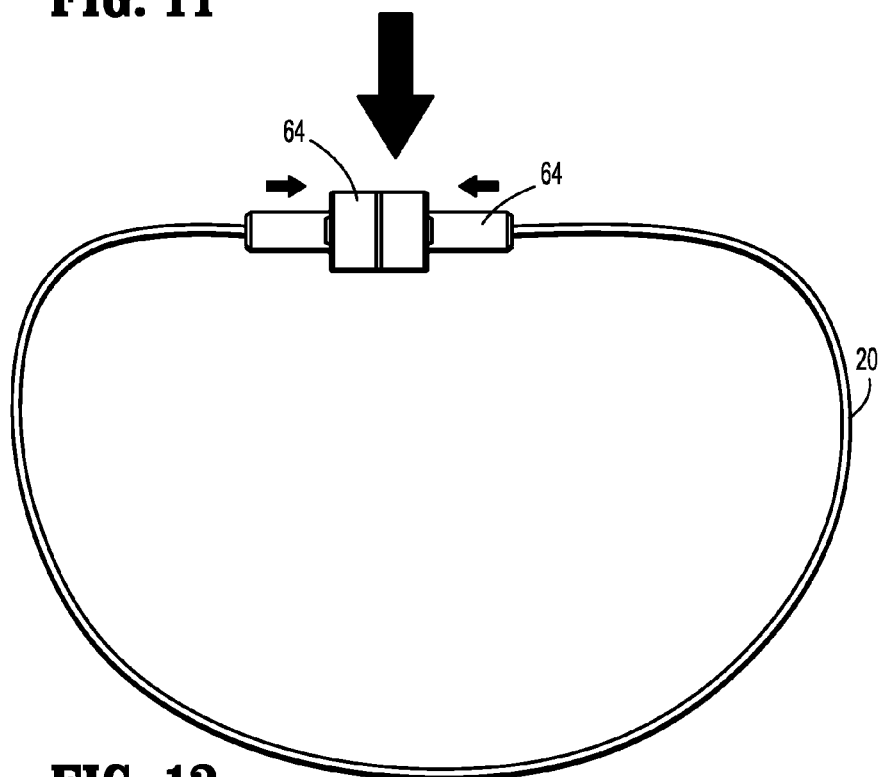
FIG. 12 is a view illustrating the connectors of the cord in a secured condition thereof.
Figure 13:
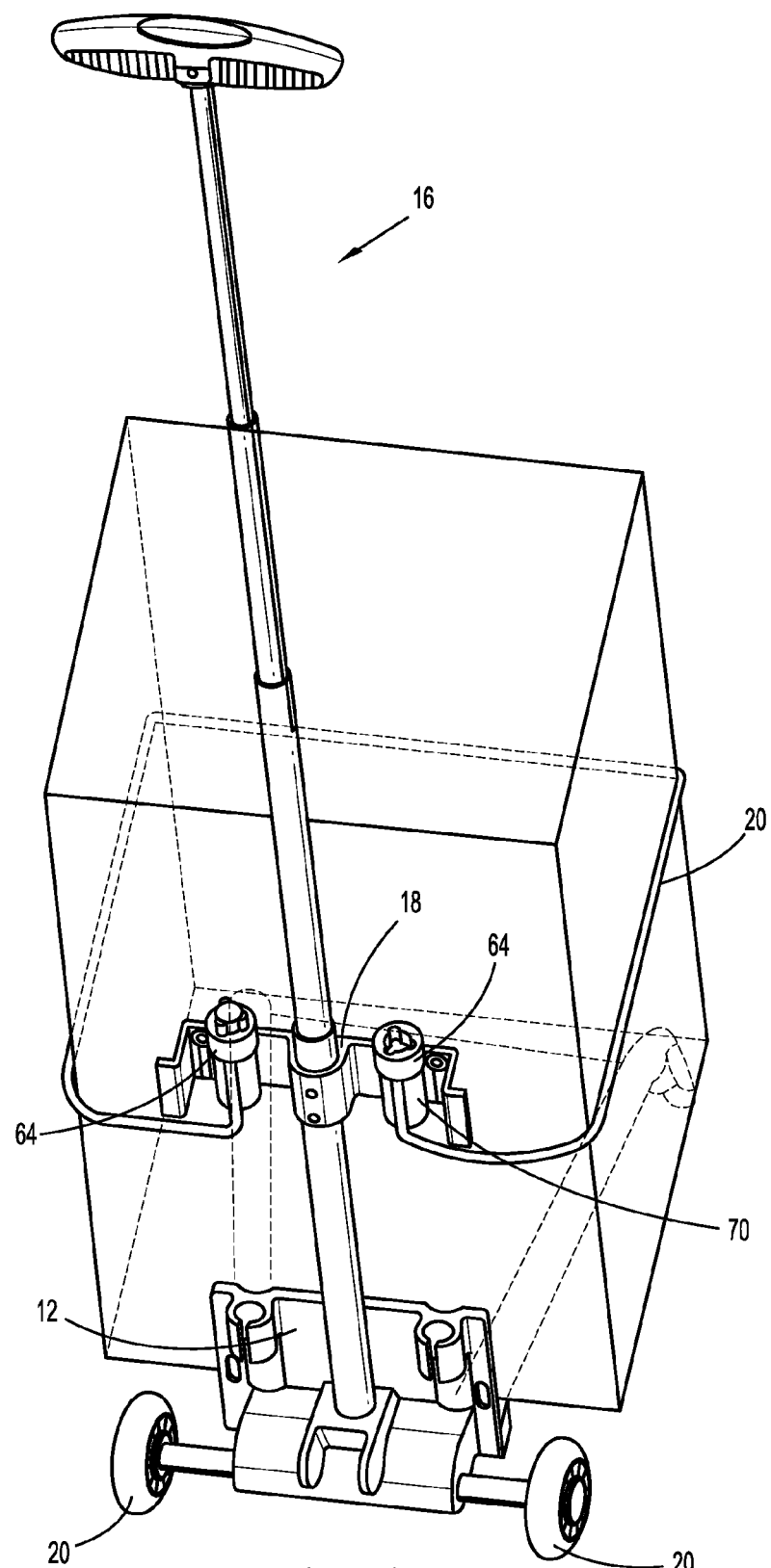
FIGS. 13-14 are perspective views illustrating the transport apparatus supporting an item with the cord secured about the item.
Figure 14:
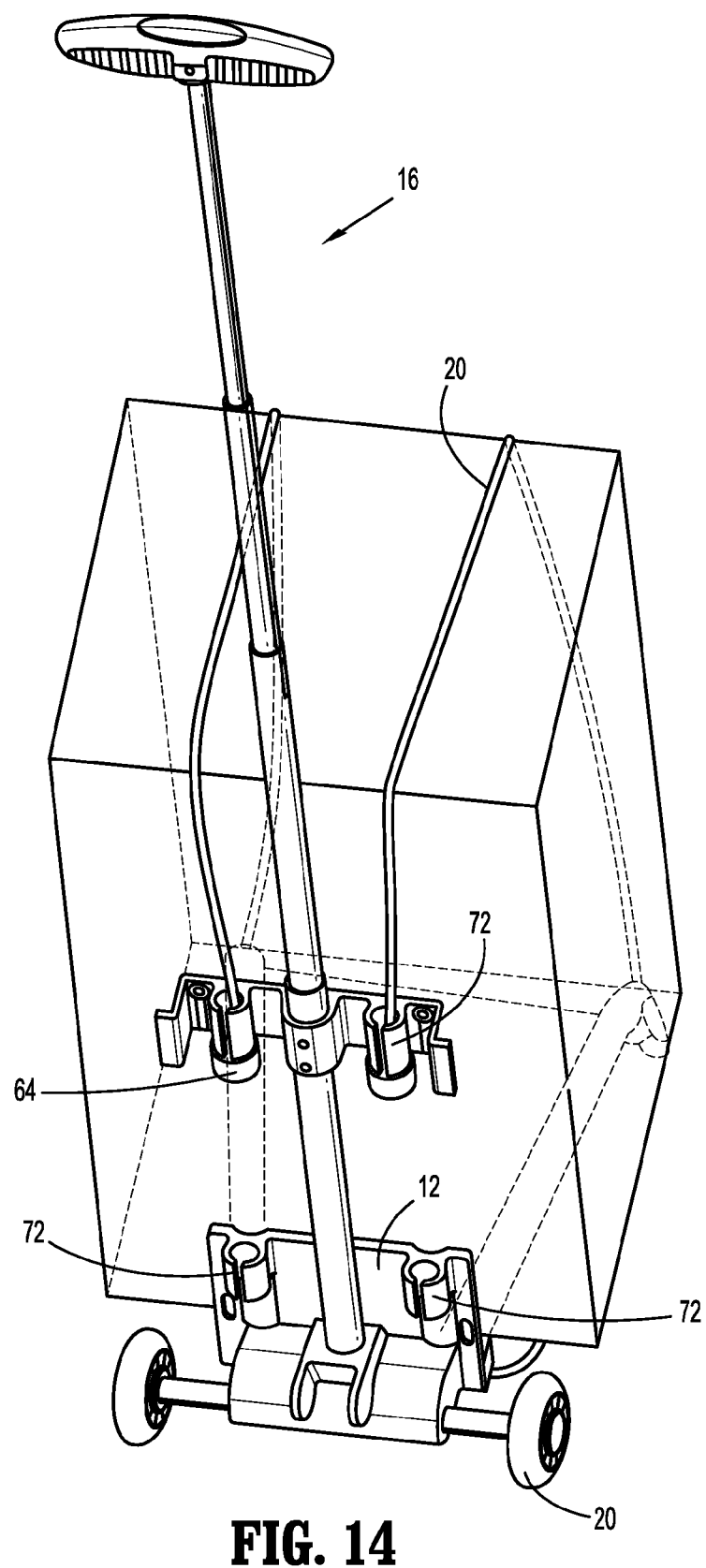

With reference to FIGS. 11-12, cord 20 includes connectors 64 mounted at each end of the cord. Connectors 64 may include structure such as a cooperating tongue 66 and groove 68 arrangement to facilitate attachment to each other (FIG. 12). In the alternative, and with reference to FIGS. 13-14, connectors 64 may be received within connector lock grooves 70 on the rear side of retainer support to secure the connectors 64 and thus the cord 20 about the item as seen in FIG. 13 or FIG. 14. Connectors 64 may snap fit within lock grooves 70 or establish a friction fit therewith. In another method, connectors may snap fit or cooperate with corresponding lock grooves 72 on the back end of base 12 to secure the connectors 64 and thus the cord 20 about the item.

Figure 15:
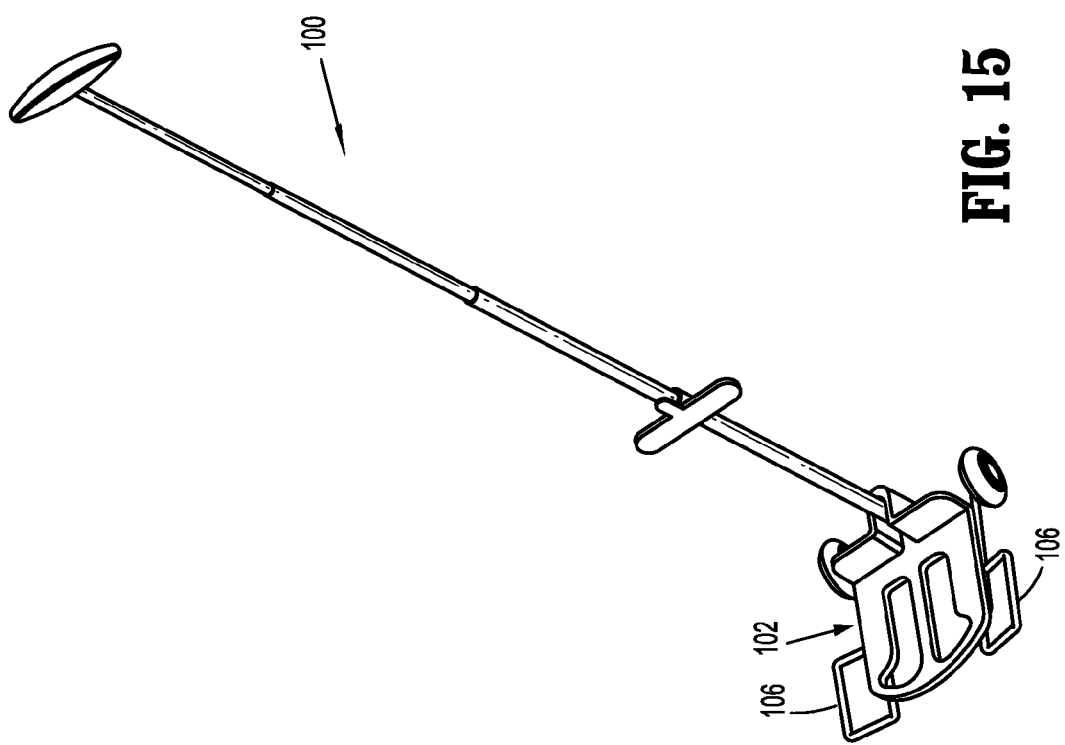
FIG. 15 is a perspective view of an alternate embodiment of the transport apparatus of the present invention in an open operative condition thereof.
Figure 16:
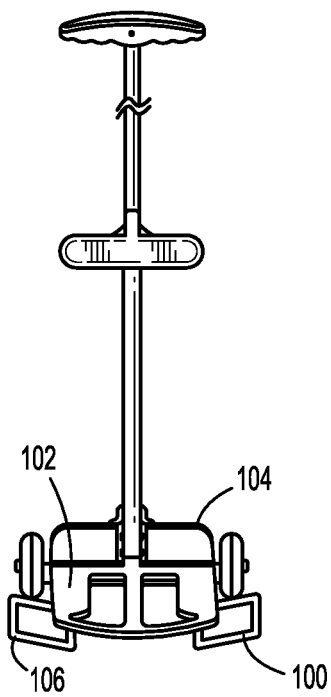
FIG. 16 is a frontal view of the transport apparatus of FIG. 15.
Figure 17:
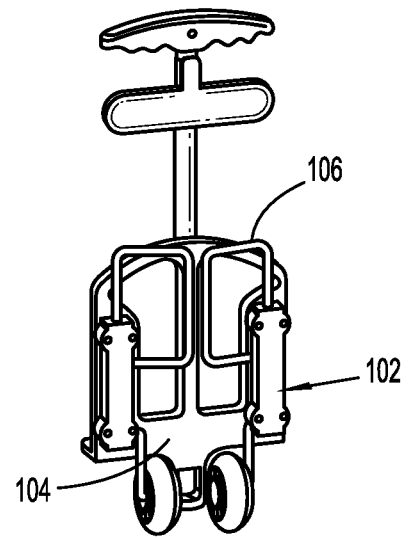
FIG. 17 is a view of the transport apparatus in the closed inoperative condition.

FIG. 15 illustrates another embodiment of the apparatus of the present disclosure. Apparatus 100 includes platform 102 which pivots between open operative position (FIG. 16) and closed stored position (FIG. 17). Platform 102 includes a rigid support member 104 and a pair of racks 106 mounted to the sides of the rigid member 104. Racks 106 are pivotally mounted to support member 104 and may pivot between inward (FIG. 18) and outward positions (FIG. 19). Any means for permitting pivotal movement of racks 106 is envisioned. In one embodiment, platform 102 includes transverse grooves 110 on its lower sides which accommodate the back leg 112 of racks 106 during rotational movement of the racks 106 between the open and closed stored positions. In addition, racks 106 may be releasably mounted or secured in either the inward or outward position through suitable means including detent, ratchet means or the like. In the outward position, racks present a greater support area for the item.

Figure 18:
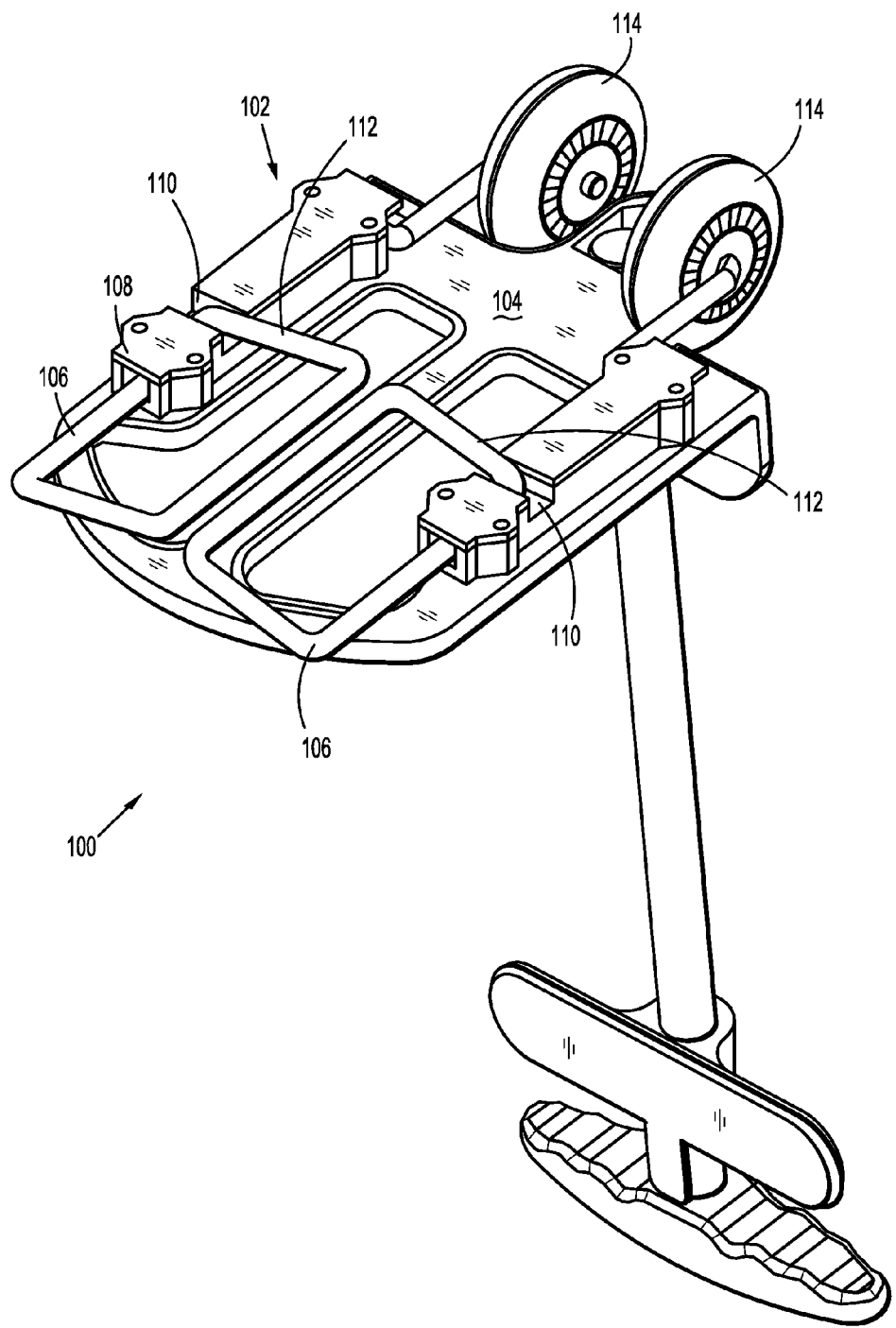
FIG. 18 is a bottom perspective view of the apparatus illustrating the racks in a closed condition.
Figure 19:
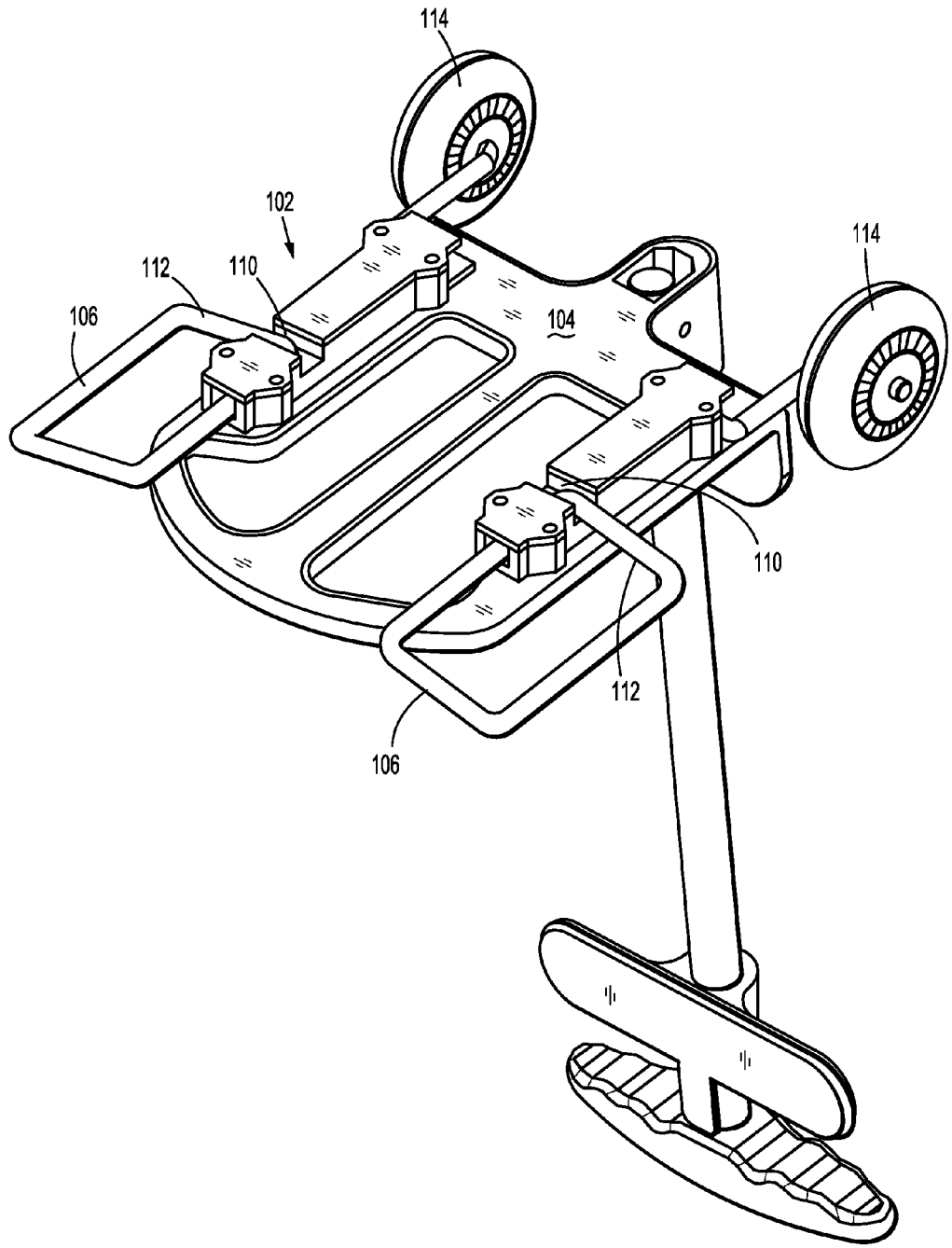
FIG. 19 is a view similar to the view of FIG. 18 illustrating the racks in an open condition thereof.
Figure 20:
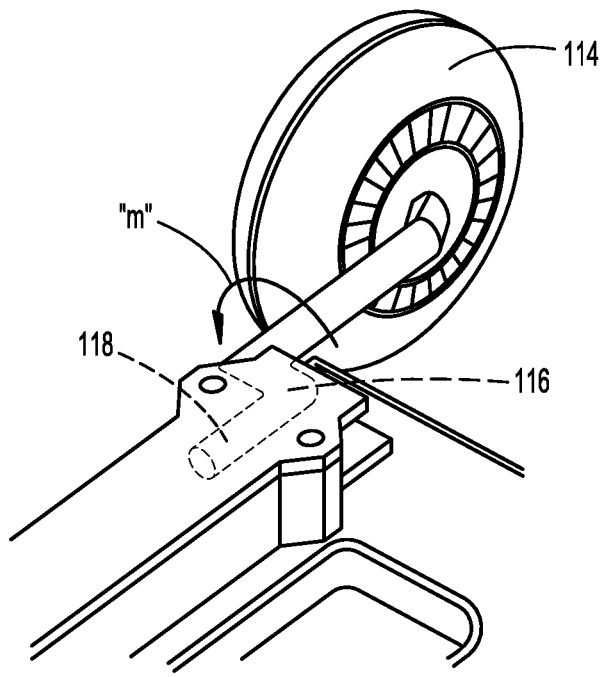
FIGS. 20-21 are view illustrating the wheels in first and second positions thereof.

With reference to FIGS. 18-21, wheels 114 also may be laterally displaced between first and second positions depicted in FIGS. 18 and 19 respectively. In one embodiment depicted in FIGS. 20 and 21, wheels 114 each include a wheel axle 116 having a longitudinal segment 118 (shown in phantom) residing within a groove of platform 102. Wheels 114 swivel or rotate about longitudinal segment 118 in an inward direction relative to the views of FIGS. 20-21 to assume either the first or second position. For example, when in the open or second position of FIG. 20, wheels 114 will be rotated in the direction of directional arrow "m" to assume the first position of FIG. 21. In the first position of FIG. 21, wheels 114 will be rotated in the direction of directional arrow "b" to assume the displaced position of FIG. 20. Other means for effecting displacement of wheels 114 are also envisioned.

Figure 21:
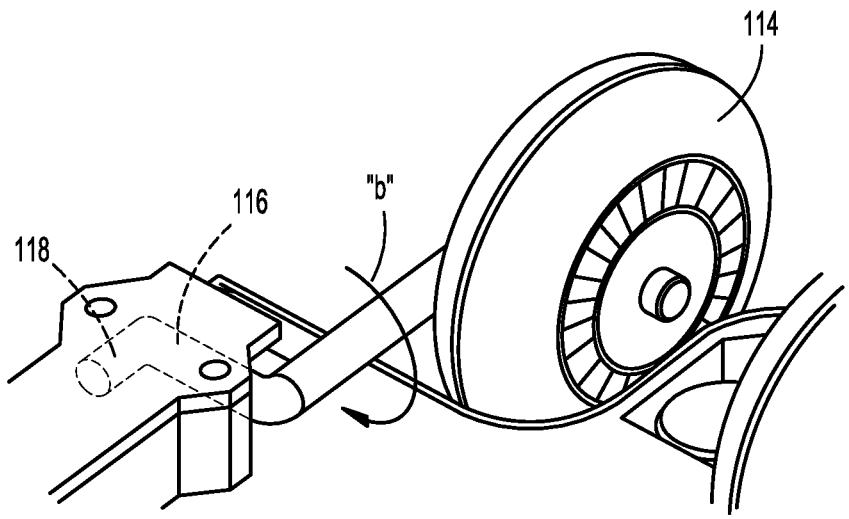
Figure 22:
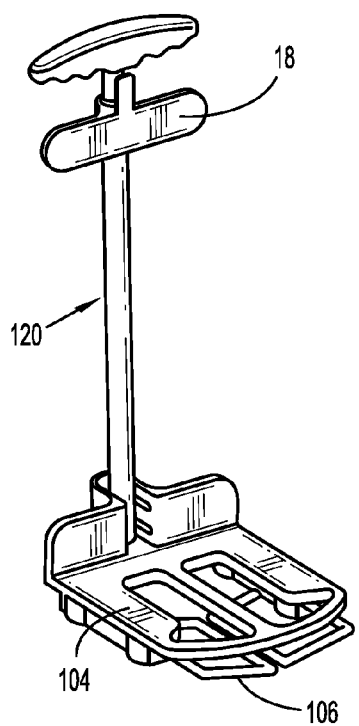
FIGS. 22-23 are perspective views illustrating the handle in the respective open and stored conditions thereof.
Figure 23:
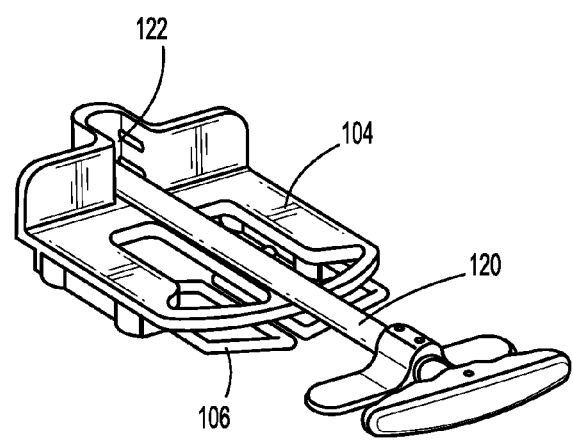

As depicted in FIGS. 21-22, handle 120 is also adapted for telescoping movement in a similar manner to that discussed in connection with the embodiment of FIG. 1. In accordance with another feature, handle 120 may be pivoted from its operative position of FIG. 21 and its stored position of FIG. 22 to assume a compact condition for storage. Channel 122 within platform 102 accommodates handle 120 during such pivotal movement.

Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure.

What is claimed is:

1. An apparatus for transporting items, which comprises:
    a base defining a longitudinal axis;
    a handle element extending from the base;
    a pair of rollers mounted to the base; and
    a platform mounted to the base and adapted for movement between a stored condition and an operative condition, the platform including first and second leg elements and a platform support connected to the first and second leg elements and extending therebetween, the platform dimensioned and adapted to carry an object when in the operative condition, the first and second leg elements being adapted to pivot about respective pivot axes which are obliquely arranged relative to the longitudinal axis of the base whereby the first and second leg elements are in a relative approximated condition when the platform is in the stored condition and are in a relative open condition when the platform is in the operative condition with the first and second leg elements obliquely arranged relative to each other and the longitudinal axis of the base.

2. The apparatus according to claim 1 wherein the platform support comprises a flexible material.

3. The apparatus according to claim 2 wherein the platform support comprises a fabric material.

4. The apparatus according to claim 1 including a retainer support mounted to the handle.

5. The apparatus according to claim 4 wherein the retainer support is dimensioned and positioned to support the object carried by the platform.

6. The apparatus according to claim 4 wherein the retainer support includes a cord mountable thereto, the cord adapted for positioning about the object to secure the object relative to the platform.

7. The apparatus according to claim 6 wherein the cord includes a connector at one end thereof and the retainer support includes a connector lock groove, the connector dimensioned to be received within the connector lock groove of the retainer support to secure the cord about the object and relative to the retainer support.

8. The apparatus according to claim 6 including a connector at each end of the cord, the connectors dimensioned and adapted to couple to each other. secured to each other when the platform is in the operative position to thereby increase stability and enhance support of the object the retainer support having at least one connector lock groove; and
    a cord adapted for positioning about the object to secure the object relative to the platform.

9. The apparatus according to claim 1 wherein the rollers are adapted for relative movement between a first roller position defining a first predetermined distance therebetween and a second relative position defining a second predetermined distance therebetween greater than the first predetermined distance.

10. The apparatus according to claim 1 wherein the handle includes at least two handle segments, the at least two handle segments in telescoping arrangement to vary an effective length of the handle.

11. The apparatus according to claim 1 wherein the first and second leg elements are dimensioned and configured to be in general parallel relation to each other and the longitudinal axis of the base when in the relative approximated condition and when the platform is in the stored condition.

12. The apparatus according to claim 1 wherein the base includes opposing grooves, the grooves being arranged at an acute angle relative to each other, the groves dimensioned to at least partially respective first and second leg elements.

* * * * *